O. KNÖPFLI.
METHOD OF REGULATING THE SPEED OF ALTERNATING CURRENT MOTORS.
APPLICATION FILED APR. 10, 1911.

1,137,866.

Patented May 4, 1915.
2 SHEETS—SHEET 1.

WITNESSES:
Chas. A. Becker

INVENTOR:
Otto Knöpfli,
BY
ATTORNEY

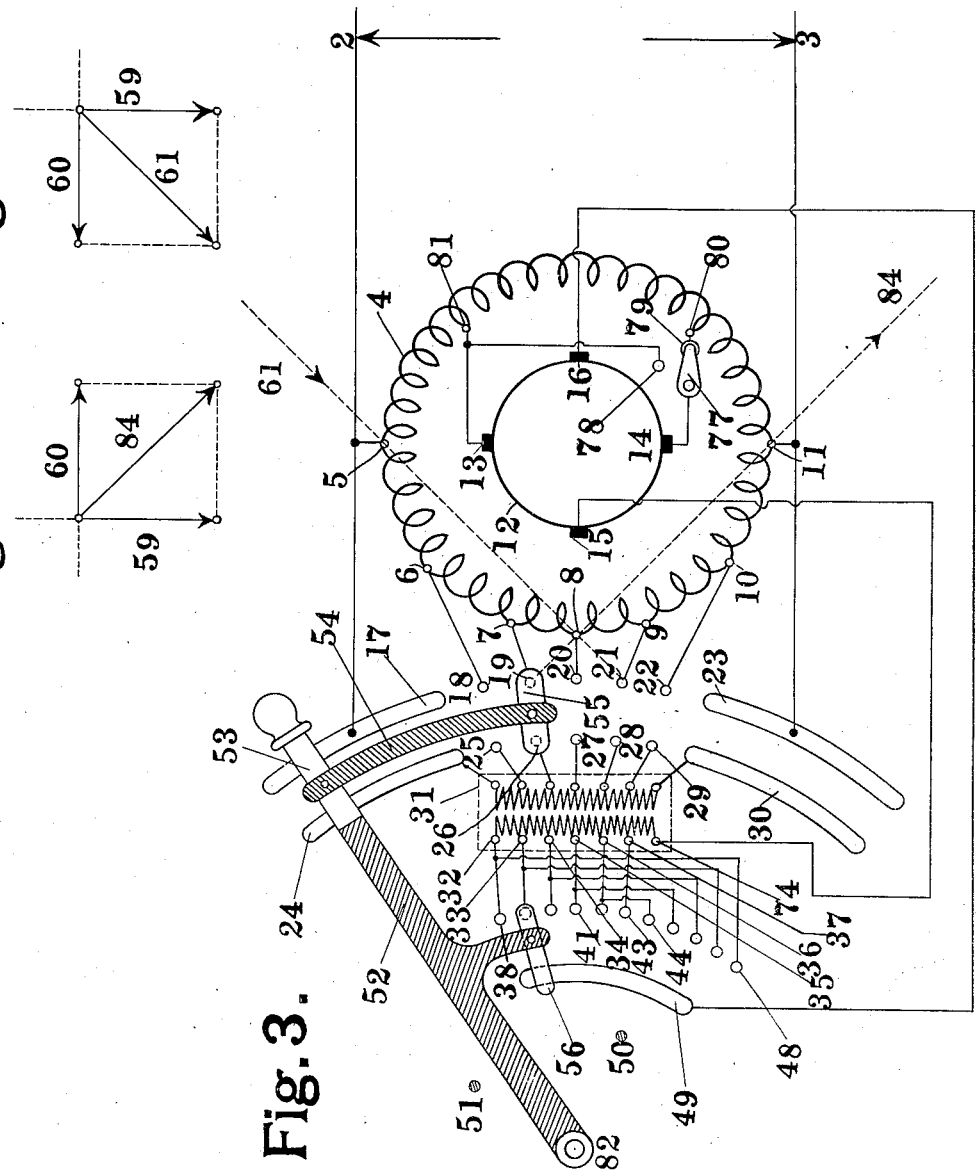

UNITED STATES PATENT OFFICE.

OTTO KNÖPFLI, OF ZURICH, SWITZERLAND, ASSIGNOR, BY MESNE ASSIGNMENTS, TO WAGNER ELECTRIC MANUFACTURING COMPANY, OF ST. LOUIS, MISSOURI, A CORPORATION OF MISSOURI.

METHOD OF REGULATING THE SPEED OF ALTERNATING-CURRENT MOTORS.

1,137,866.  Specification of Letters Patent.  Patented May 4, 1915.

Application filed April 10, 1911. Serial No. 620,059.

*To all whom it may concern:*

Be it known that I, OTTO KNÖPFLI, a citizen of Switzerland, residing at Zurich, Switzerland, have invented certain new and useful Improvements in Methods of Regulating the Speed of Alternating-Current Motors; and I do hereby declare the following to be a full, clear, and exact description of the invention, such as will enable others skilled in the art to which it appertains to make and use the same.

My invention relates to alternating current motors and, more particularly, to single-phase commutator motors provided with working and exciting brushes and having a shunt characteristic.

It is the object of my invention to provide a method of operating such motors whereby the speed as well as the power factor can be adjusted with ease and precision within wide limits.

Generally speaking, I achieve this object by making use of a distributed winding on the stator, providing the same with a number of taps, connecting the exciting brushes of the machine to certain of said taps through a variable ratio transformer, and adjusting the power factor and speed of the motor with the help of said taps and of the variable ratio transformer. This adjustment is carried out by simultaneously changing the number of turns of the stator windings included between the exciting brushes, the axis of said stator turns and the ratio of the transformer interposed between the stator winding and the exciting brushes.

Figure 1:
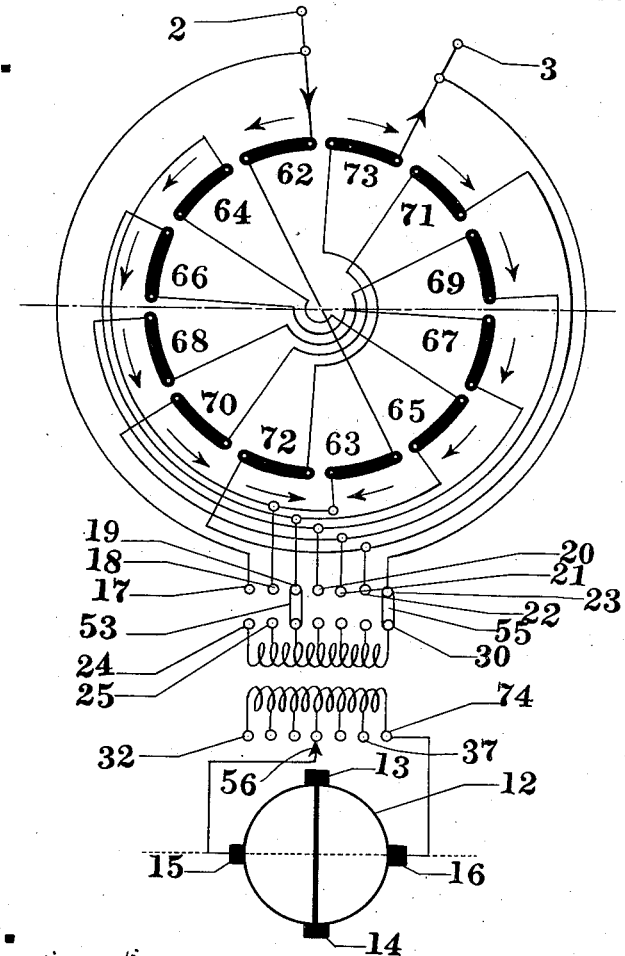
Figure 2:
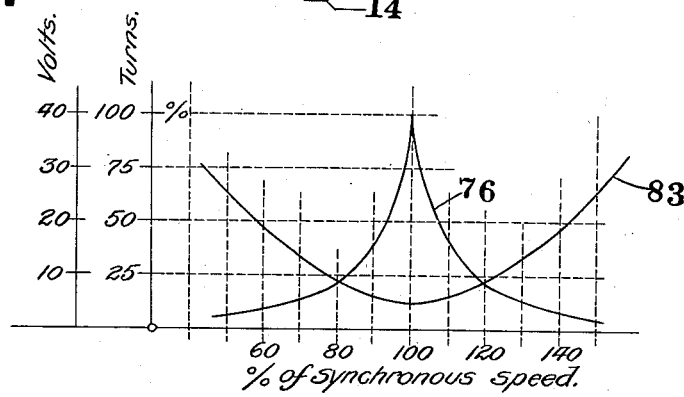

My invention will be better understood by reference to the accompanying drawings, Figure 1 of which illustrates one embodiment of my invention, while Fig. 2 is a diagram indicating the rate at which I can change the number of stator turns included in the exciting brush circuit and the magnitude of the voltage simultaneously impressed on said brushes.

In Fig. 1 is shown a motor with short-circuited brushes 13, 14, in which the stator winding is divided into twelve sections, 62 to 73 inclusive, all connected in series and each producing a magnetization directed as indicated by the arrows shown in the figure. Taps 17 to 23 inclusive are brought out from this stator winding, their ends being disposed with respect to the taps 24 to 30 inclusive, belonging to the primary of an adjustable ratio transformer. The secondary of this transformer is connected to the exciting brushes 15, 16, and is provided with the taps 74 and 32 to 37 inclusive. The exciting brush 16 is permanently connected to the tap 74, while 15 can be connected to any of the taps by means of the moving contact or blade 56. Two blades 53 and 55 coöperate with the contacts 17 to 23 and 24 to 30 inclusive. The synchronous speed of this machine is obtained when the blade 53 stands on points 17 and 24 while the blade 55 bridges the points 23 and 30. At this time, the blade 56 is preferably placed on point 37. If it be desired to increase the speed of the machine above the synchronous, the blade 53 is kept stationary while the blade 55 is moved from right to left, the highest speed being reached when said contact comes to bridge points 18 and 25. Simultaneously with this movement of the blade 55, the blade 56 is moved from right to left, thus increasing the transformation ratio of the transformer interposed between the stator winding and the exciting brushes. When blade 55 comes to stand on points 18 and 25, then blade 56 should stand on point 32 and the motor will run at its highest speed. If it be desired to reduce the speed of this motor below the synchronous, then blade 55 is kept stationary, bridging contacts 23 and 30, while blade 53 is gradually moved from left to right, leaving that position in which it bridges the points 17 and 24 and traveling in the direction of the blade 55. Simultaneously the blade 56 is moved from point 37 to point 32. The highest speed of the machine will be reached when blade 53 stands on points 22 and 29, at which time the blade 56 should stand on point 32.

Fig. 2 indicates how the number of turns included between the terminals of the primary of the transformer 31 can be varied for the purpose of obtaining certain speeds. This figure also shows the manner in which the voltage impressed on the exciting brushes is simultaneously varied. It is seen that at synchronism, the number of turns included between the primary terminals of the transformer 31 and, therefore, the voltage impressed on said transformer is 100% as shown by the curve 76, while the voltage impressed on the exciting brushes is a minimum, as shown by the curve 83. At this point, the transformer reduces the voltage impressed on it. Whether the speed is increased above the synchronous or decreased below that value, the number of turns included between the terminals of the primary of the transformer 31 and, therefore, the voltage impressed thereon is decreased as indicated by the curve 76, while the voltage impressed on the exciting brushes 15 and 16 is increased by means of the variable ratio transformer, as indicated by the curve 83.

With further reference to the mode of operation of this machine, it will be seen that when the voltage impressed on the primary of the transformer interposed between the stator winding and the exciting brushes is derived from the terminals 2, 3 of the stator winding, then said voltage will be of the same phase as that of the supply and will be equal in magnitude. When the blade 53 is kept stationary on contacts 17 and 24, while blade 55 is moved from its extreme position on the right in the direction of the blade 53, then the voltage impressed on the primary of the transformer undergoes two changes—it diminishes in magnitude and its phase with relation to that of the supply alters. Its magnitude diminishes because a number of stator turns included between the blades 53 and 55 diminish, and its phase changes because the axis along which this voltage is picked off the stator winding departs more and more from that along which the supply voltage is impressed on said winding. The change in the phase of the voltage picked off the stator winding makes it possible to affect the speed of the machine, the latter depending on the magnitude of that component of the voltage impressed on the primary of the variable ratio transformer which is at ninety electrical degrees to the line voltage. The component in phase with the line voltage only affects the power factor of the machine. It will be readily seen that the compensating component steadily diminishes as the blade 55 is moved to the left, while the speed regulating component steadily increases. Now it so happens that in case the speed is reduced below the synchronous, the compensating component should increase and not decrease with decreasing speed, while the converse is true for speeds above the synchronous. These facts clearly make it impossible to successfully adjust the speed and the power factor of such a machine by simply connecting the exciting brushes to various portions of the stator winding. But I have found that this difficulty can be overcome by interposing a variable ratio transformer between the stator winding and the exciting brushes and so operating the machine that the transformation ratio of said transformer is suitably adjusted every time one set of stator taps is exchanged for another.

While the number of taps on the primary and secondary windings of the transformer 31 have been shown as equal in Fig. 1, yet this is by no means necessary. The secondary of this transformer can be provided with a different number of taps than the primary.

I claim:

1. The method of adjusting the speed of an alternating current motor having a stator winding, working brushes on the rotor, exciting brushes displaced from the working brushes and connected to the stator winding by way of an adjustable ratio transformer, which comprises varying the phase of the E. M. F. impressed on the primary of the transformer, and simultaneously varying the transformation ratio of said transformer.

2. The method of adjusting the speed of an alternating current motor having a stator winding, working brushes on the rotor, exciting brushes displaced from the working brushes and connected to the stator winding by way of an adjustable ratio transformer, which comprises varying the phase of the E. M. F. impressed on the primary of the transformer by connecting said primary to the stator winding along different axes, and simultaneously varying the transformation ratio of said transformer.

3. The method of adjusting the speed of an alternating current motor having a distributed stator winding, working brushes on the rotor, exciting brushes displaced from the working brushes and connected to the stator winding by way of an adjustable ratio transformer, which consists, when changing the speed from the synchronous to higher or lower speeds, in simultaneously changing the axis along which the primary of the transformer is connected to the stator winding and decreasing the number of turns of the stator winding included in circuit with said primary.

4. The method of adjusting the speed of an alternating current motor having a distributed stator winding, working brushes on the rotor, exciting brushes displaced from the working brushes and connected to the stator winding by way of an adjustable ratio transformer, which consists, when changing the speed from synchronous to higher or lower speeds, in changing the axis along which the primary of the transformer is connected to the stator winding, and simultaneously varying the transformation ratio of said transformer.

In testimony whereof I have affixed my signature in presence of two witnesses.

OTTO KNÖPFLI.

Witnesses:
ARTHUR J. BUNDY,
EMIL CONRAD REDINGER.

---

It is hereby certified that in Letters Patent No. 1,137,866, granted May 4, 1915, upon the application of Otto Knöpfli, of Zurich, Switzerland, for an improvement in "Methods of Regulating the Speed of Alternating-Current Motors," an error appears requiring correction as follows: In the drawings, cancel sheet 2, containing Figures 3, 4, and 5; and that the said Letters Patent should be read with this correction therein that the same may conform to the record of the case in the Patent Office.

Signed and sealed this 5th day of October, A. D., 1915.

[SEAL.]

R. F. WHITEHEAD,

*Acting Commissioner of Patents.*